(12) United States Patent
Schriefer (10) Patent No.: US 8,705,953 B2
(45) Date of Patent: Apr. 22, 2014

(54) DISTANCE MEASUREMENT

(75) Inventor: Bernhard Schriefer, Berlin (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/203,970

(22) PCT Filed: Mar. 10, 2010

(86) PCT No.: PCT/DE2010/000271
§ 371 (c)(1), (2), (4) Date: Nov. 10, 2011

(87) PCT Pub. No.: WO2010/102613
PCT Pub. Date: Sep. 16, 2010

(65) Prior Publication Data
US 2013/0004154 A1    Jan. 3, 2013

(30) Foreign Application Priority Data
Mar. 11, 2009   (DE) .................... 10 2009 012 646

(51) Int. Cl.
| | | |
|---|---|---|
| *H04B 10/08* | (2011.01) | |
| *H04J 14/02* | (2006.01) | |
| *G01S 17/10* | (2006.01) | |
| *G01J 3/28* | (2006.01) | |
| *G01J 3/14* | (2006.01) | |
| *G01S 13/36* | (2006.01) | |
| *G01S 15/36* | (2006.01) | |
| *G01S 17/36* | (2006.01) | |
| *H04B 10/079* | (2013.01) | |

(52) U.S. Cl.
CPC .............. *G01S 13/36* (2013.01); *G01S 15/36* (2013.01); *G01S 17/36* (2013.01); *H04B 10/0795* (2013.01); *H04B 10/07957* (2013.01)
USPC .................. 398/9; 356/5; 356/303; 356/300; 356/336

(58) Field of Classification Search
CPC ......... G01S 13/36; G01S 15/36; G01S 17/36; H04B 10/07595; H04B 10/07957
USPC ........... 398/9; 356/5, 300, 303, 336, 349, 127
See application file for complete search history.

(56) References Cited

U.S. PATENT DOCUMENTS 4,537,502 A * 8/1985 Miller et al. ................. 356/5.11
4,818,100 A * 4/1989 Breen .......................... 356/5.06

(Continued)

FOREIGN PATENT DOCUMENTS

GB   2 336 493 A   10/1999

OTHER PUBLICATIONS

Huder, Introduction to Radar Technology, Stuttgart (u.a.): Teubner, pp. 56-58 (1999).

(Continued)

*Primary Examiner* — Ken Vanderpuye
*Assistant Examiner* — Abbas H Alagheband
(74) *Attorney, Agent, or Firm* — Foley & Lardner LLP (57) ABSTRACT

Provided in accordance with the invention is a method for measuring the distance of an object in which a transmitted signal (S) with a pulse train having a prescribed pulse repetition frequency (fw) is generated such that the transmitted signal has a frequency comb in the frequency domain, the transmitted signal is directed onto the object, and a reflected signal (R) reflected from the object is received, the phase difference ($\phi_{MESS,1}$) between the transmitted signal and the reflected signal is determined for a prescribed spectral line of the frequency comb, and the distance is determined with the aid of the phase difference.

11 Claims, 8 Drawing Sheets

(56) References Cited

U.S. PATENT DOCUMENTS

| | | | | |
|---|---|---|---|---|
| 4,856,009 A | * | 8/1989 | Hall et al. | 372/32 |
| 5,054,912 A | * | 10/1991 | Kuchel | 356/5.11 |
| 5,742,379 A | * | 4/1998 | Reifer | 356/5.07 |
| 6,184,981 B1 | * | 2/2001 | Hasson et al. | 356/303 |
| 2003/0156057 A1 | * | 8/2003 | Rohling et al. | 342/109 |
| 2010/0153062 A1 | * | 6/2010 | Maltseff | 702/159 |
| 2010/0208231 A1 | * | 8/2010 | Murai | 356/4.01 |
| 2010/0284431 A1 | * | 11/2010 | Inoue | 372/32 |

OTHER PUBLICATIONS

Examination Report related German Patent Application No. 10 2009 012 646.5, dated Oct. 9, 2012.

International Search Report in PCT/DE2010/000271 dated Aug. 26, 2010.

International Preliminary Report on Patentability in PCT/DE2010/000271 dated Sep. 29, 2011.

* cited by examiner

DISTANCE MEASUREMENT

The invention relates to a method for measuring the distance between a distance measuring device and an object.

It is the object of the invention to specify a method that is easy to carry out and yet offers a high measuring accuracy.

This object is achieved according to the invention by a method having the features in accordance with patent claim 1. Advantageous refinements of the inventive method are specified in subclaims.

It is therefore provided according to the invention that a transmitted signal with a pulse train having a prescribed pulse repetition frequency is generated such that the transmitted signal has a frequency comb in the frequency domain, the transmitted signal is directed onto the object, and a reflected signal reflected from the object is received, the phase difference between the transmitted signal and the reflected signal is determined for a prescribed spectral line of the frequency comb, and the distance is determined with the aid of the phase difference.

The distance can be determined particularly easily and therefore advantageously in accordance with:

$$A = \frac{\varphi_{MESS}}{2 \cdot \pi} * c,$$

c denoting the propagation rate of the transmitted signal to the object, and $\varphi_{MESS}$ the phase difference between the transmitted signal and the reflected signal of the spectral line.

In order to increase the uniqueness range of the distance measurement, it is provided in accordance with an advantageous refinement of the method that the phase difference between the transmitted signal and the reflected signal is determined for two spectral lines, that is to say for a first and a second spectral line, of the frequency comb, and both the phase difference between the transmitted signal and the reflected signal for the first spectral line, and the phase difference between the transmitted signal and the reflected signal for the second spectral line are used in determining the distance.

A test is preferably made as to whether the phase difference for the first spectral line is greater or less than the phase difference for the second spectral line, and the distance value is determined as a function of the test result.

If the second spectral line has a higher frequency than the first spectral line, the distance value A can be determined in accordance with $$A = c * \frac{\varphi_{MESS,2} - \varphi_{MESS,1}}{2 \cdot \pi \cdot fw} \text{ if it holds that } \varphi_{MESS,1} < \varphi_{MESS,2}$$

and $$A = c * \frac{\varphi_{MESS,1} - \varphi_{MESS,2} + 2 \cdot \pi}{2 \cdot \pi \cdot fw} \text{ if it holds that } \varphi_{MESS,1} > \varphi_{MESS,2}$$

c denoting the propagation rate of the transmitted signal to the object, $\varphi_{MESS,1}$ denoting the phase difference between the transmitted signal and the reflected signal for the first spectral line, $\varphi_{MESS,2}$ denoting the phase difference between the transmitted signal and the reflected signal for the second spectral line and fw denoting the pulse repetition frequency.

Two spectral lines of the frequency comb that are adjacent in the frequency spectrum are preferably evaluated as first and second spectral lines.

It is also regarded as being advantageous when the first and the second spectral lines of the transmitted signal and of the reflected signal are respectively downmixed to the same intermediate frequency, and the phase difference between the transmitted signal and the reflected signal for the first spectral line, and the phase difference between the transmitted signal and the reflected signal for the second spectral line are determined with the aid of the downmixed signals An oscillator frequency that lies in the frequency band asymmetrically between two adjacent spectral lines of the frequency comb is preferably used for the downmixing. The result of such a frequency selection is that only a single spectral line, and not two different spectral lines, of the frequency comb is downmixed to the intermediate frequency.

Preferably, the transmitted signal and the reflected signal are respectively downmixed for the first and the second spectral lines to an intermediate frequency that lies between 1 kHz and 20 MHz, and is, for example, 10.7 MHz. In the case of such a selection of the intermediate frequency, it is possible to have recourse to cost-effective mixer components from VHF radio technology.

The invention further relates to an arrangement for measuring the distance of an object. According to the invention, the arrangement is equipped with a transmitter for generating a transmitted signal that has a pulse train with a prescribed pulse repetition frequency in the time domain, and a frequency comb in the frequency domain, a receiver for receiving a reflected signal reflected by the object, and an evaluation device that uses the phase difference between the transmitted signal and the reflected signal for a prescribed spectral line of the frequency comb in order to determine the distance.

The evaluation device preferably determines the phase difference between the transmitted signal and the reflected signal for two different spectral lines of the frequency comb, and uses the two phase differences in order to determine the distance.

The evaluation device is preferably configured in such a way that it tests whether the phase difference for the first spectral line is greater or less than the phase difference for the second spectral line; it subsequently determines the distance as a function of the test result.

For the rest, it is regarded as advantageous when the arrangement has at least one switchable oscillator and at least two mixers connected to the oscillator, the two mixers optionally downmixing the first or the second spectral line of the transmitted signal and of the reflected signal to the same intermediate frequency.

The oscillator frequency of the oscillator preferably lies in the frequency band asymmetrically between two adjacent spectral lines of the frequency comb of the transmitted or reflected signal.

Exemplary embodiments of the invention are described below in conjunction with FIGS. 1 to 8. These are, of course, to be understood merely as examples.

FIGS. 1 to 8 show a method for distance measurement with periodic laser pulses as transmitted signals and one or more photodetectors as receivers. In the exemplary embodiment described below, use is made of a short pulse laser that emits pulses with the temporal length of, for example, T=100 fs and with a repetition rate of, for example, fw=100 MHz. The wavelength of the laser is preferably in the infrared region.

In the case of the exemplary embodiments described here, electromagnetic waves in the form of laser radiation are used for the distance measurement; of course, it is also possible to use other types of measuring beams, for example, microwaves, acoustic waves or the like.

Figure 1:
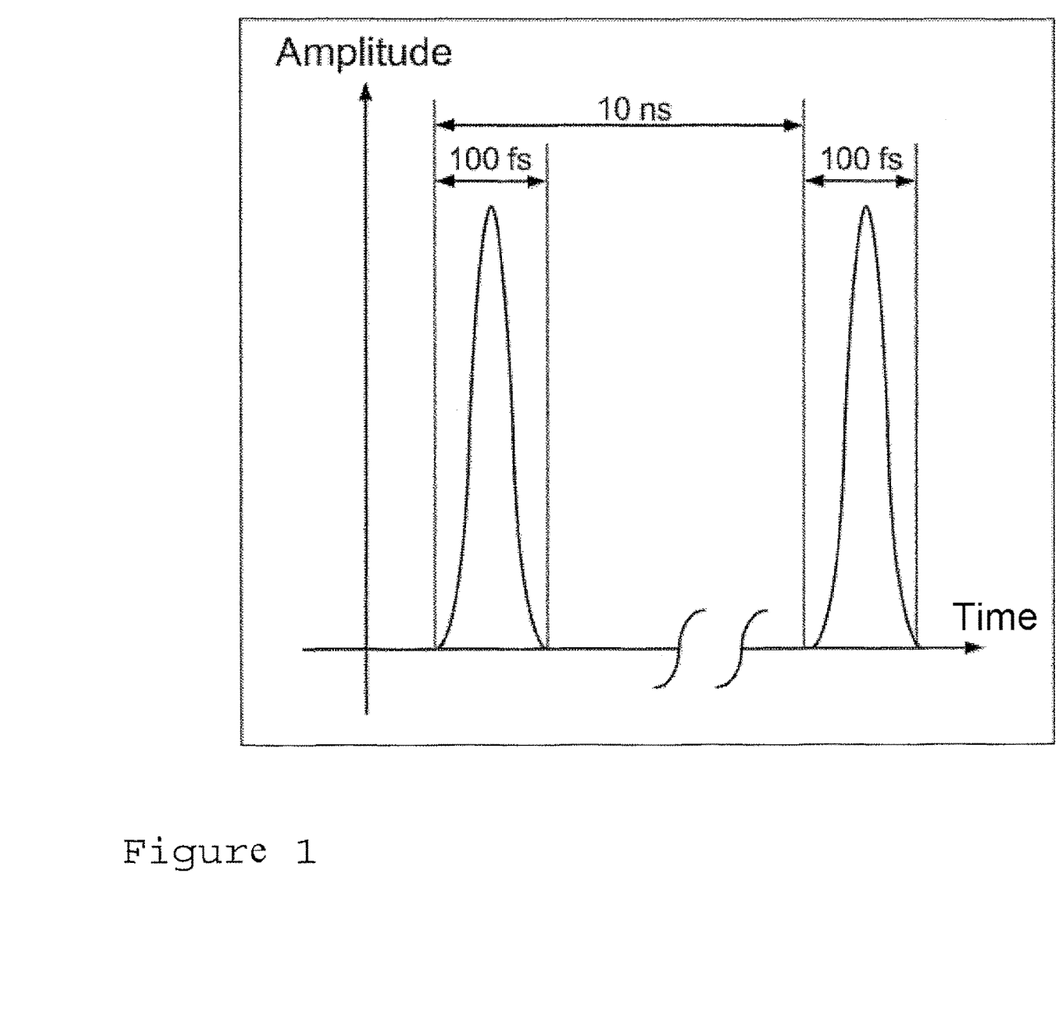

FIG. 1 shows the time profile of the laser pulses, by way of example. The average power of the laser is 100 mW, for example. The pulse shape is secant hyperbolic squared (sech²), for example.

For the reception of the laser signal by a photodiode, an electrical signal is produced at the output of the photodiode. In a way similar to the laser signal, said signal consists of short pulses with the repetition rate fw=100 MHz.

Figure 2:
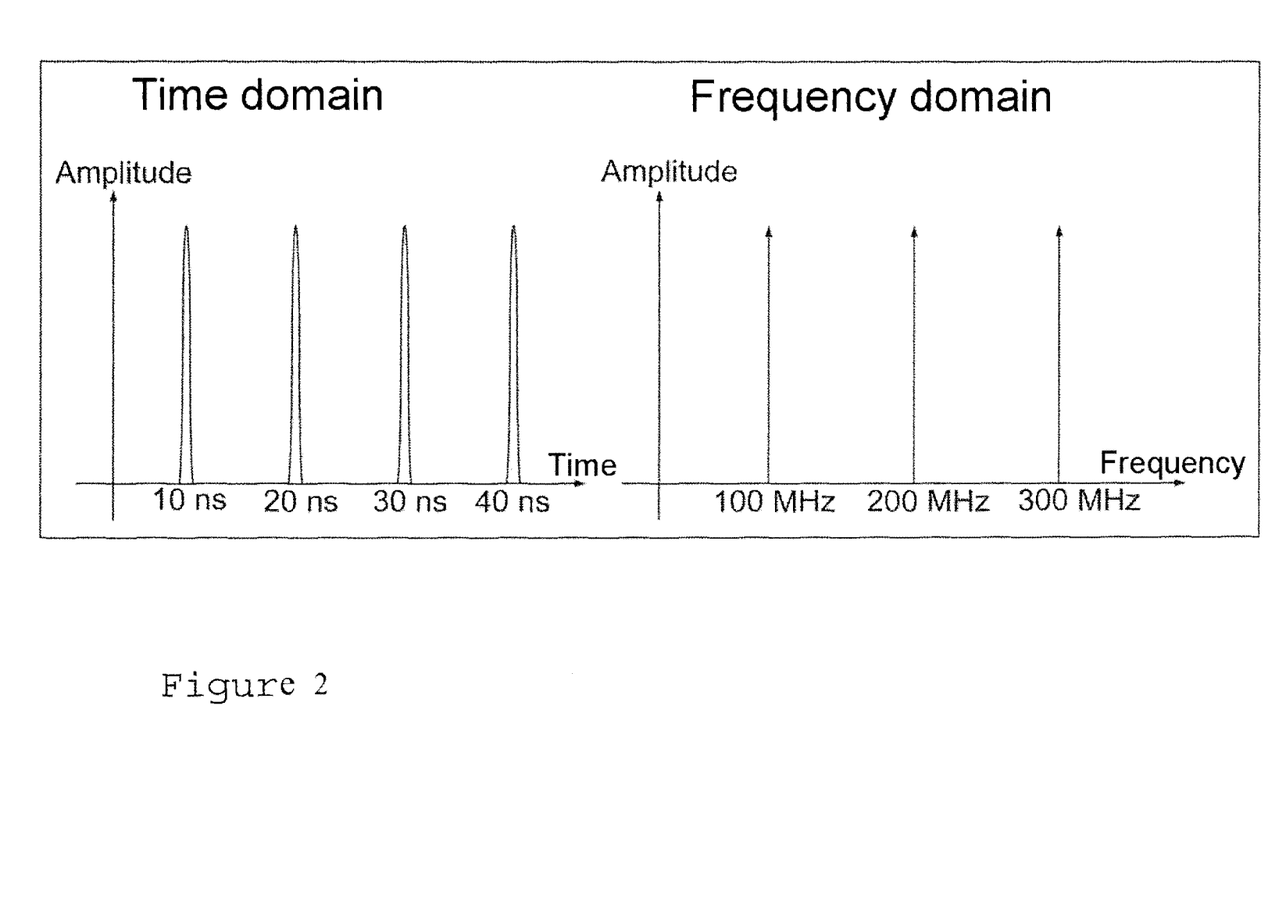

FIG. 2 shows by way of example the electrical signal that is delivered by the photodiode. The pulse comb in the time and frequency domains at the output of the photodiode are to be seen. In the frequency domain, the signal consists of equidistant spectral lines at a spacing of 100 MHz. Owing to the very short pulses, the frequency domain of the pulse comb extends as far as into the order of magnitude of several thousand gigahertz (>1000 GHz).

Figure 3:
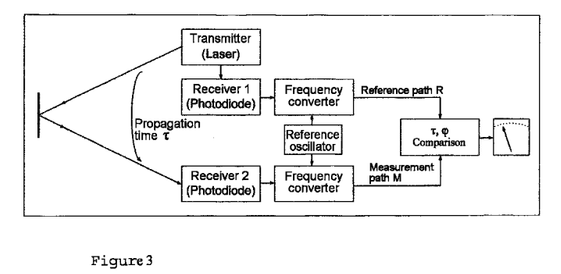

FIG. 3 shows an exemplary embodiment for an arrangement for distance measurement. The light produced by the laser is led to the photodiode twice. Firstly, directly after emission (reference path R), and a second time after reflection has occurred at the measurement object (measurement path M). In order to simplify the evaluation of the signals, they are converted to a lower intermediate frequency with the aid of a frequency converter (mixer). The phase information of the signals relative to one another is maintained in this case. Consequently, two downmixed signals are available at the input of the phase comparator—the reference signal R and the measurement signal M.

Figure 4:
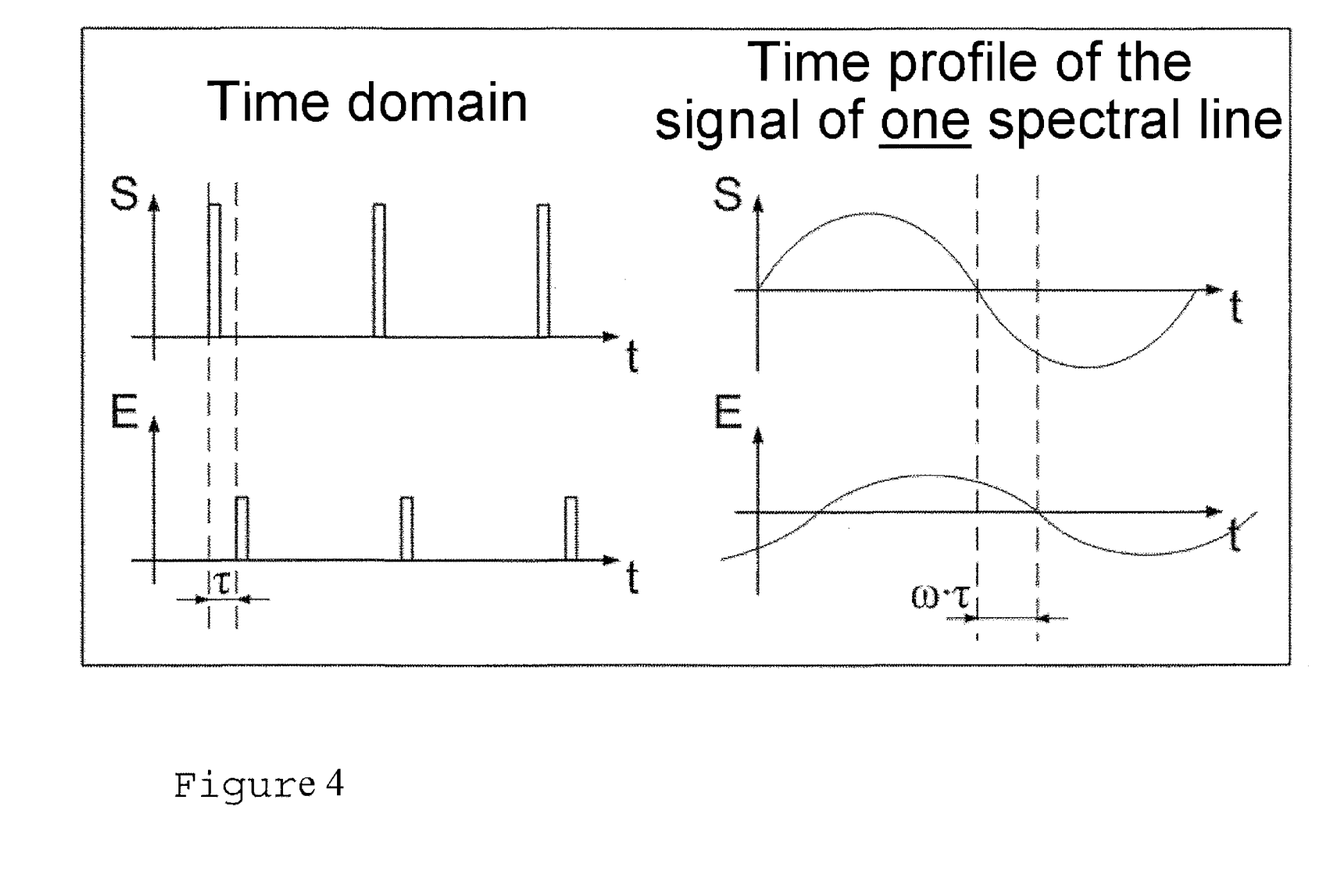

FIG. 4 shows the signals delivered by two photo receivers (photodiode with amplifier), and the time and phase offset of reference and measurement signals. In the time domain, the pulse combs are offset from one another by the propagation time $\tau$. The offset of the phase by $\phi=\omega\cdot\tau$ is to be seen from the time profile of the voltage for only a single spectral line (sinusoidal profile). As already mentioned, the temporal and phase offsets of reference and measurement signals are also maintained after the frequency conversion.

The targeted propagation time is therefore easily determined in accordance with the relationship $$\tau=\phi/\omega, \quad (1)$$

where $\omega=2\pi f$, and f is the frequency of the two received signals (R, M). The frequency f is known with extremely high accuracy in the case of use of a femtosecond laser.

In the exemplary embodiments described here, a spectral line at 24 GHz is evaluated. Since the phase shift is proportional to the frequency, it is possible to achieve a very high measuring accuracy.

Like any real oscillator, the local oscillator required for the frequency conversion is affected by phase noise. If two physically mutually independent local oscillators are used, their phase noises are not correlated with one another. In this case, the phase noise of the two local oscillators would produce an additional measurement uncertainty in the comparison of the phases of the two downmixed signals. This can be prevented in accordance with an advantageous refinement of the method, by making use of a single local oscillator for driving the two mixers. However, another local oscillator may be used for the two 100 MHz mixers (see following text and FIG. 5) than the two 24 GHz mixers.

A unique assignment of the measured phase to the propagation time can be made only within the range of 0 to 360° in the case of phase measurement. The evaluation frequency of 24 GHz corresponds to a free space wavelength of 12.5 mm and so the uniqueness range corresponds to a path distance of likewise 12.5 mm. Since the light must cover the single distance to the measurement object twice, the uniqueness range as a function of the distance to the measurement object therefore corresponds to only 6.25 mm.

Two different frequencies can be evaluated in order to increase the uniqueness range. If, in addition to 24 GHz, the fundamental frequency of the laser pulse train at 100 MHz is selected as second evaluation frequency, the uniqueness range lies at 3-(path distance) or 1.5 m (distance). The high measurement accuracy is maintained, since the signals are simultaneously evaluated at 100 MHz and 24 GHz. The advantages of high evaluation frequency (high measuring accuracy) are thus mutually combined with the advantages of low evaluation frequency (large uniqueness range).

Figure 5:
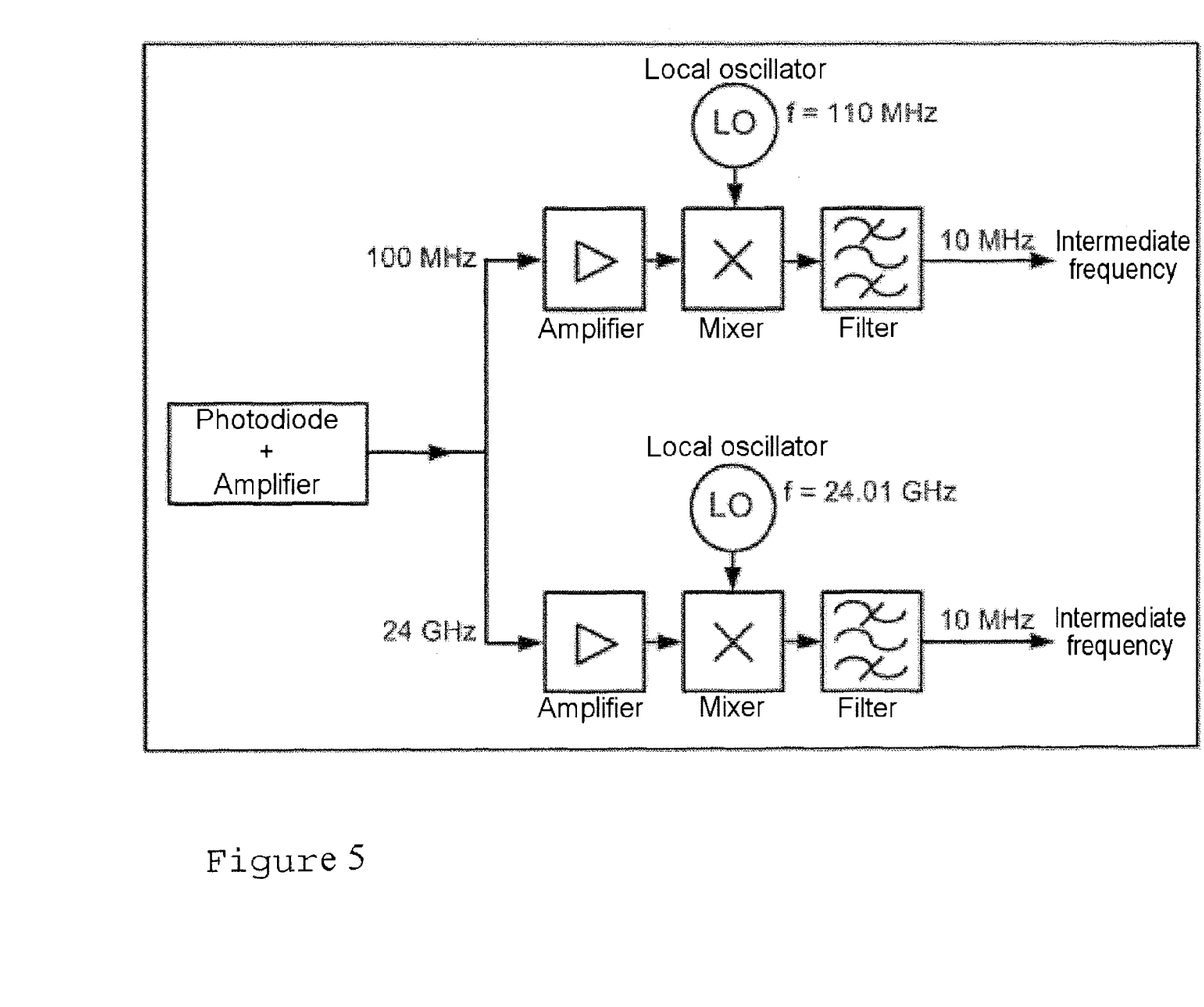

By way of example, FIG. 5 shows a combined 100 MHz/24 GHz receiver up to the intermediate frequency, as it can be implemented for evaluating the 100 MHz and 24 GHz signals for the measurement and reference channels (only one of the two channels is shown in the figure). The intermediate frequency is selected at 10 MHz in the example of FIG. 5.

The selection of the oscillator frequency (first local oscillator LO in FIG. 6) is largely arbitrary for the basic functionality of a superposition receiver. However, in conjunction with frequency combs a particularly advantageous receiver results when the first local oscillator frequency is selected in such a way that no overlapping of the spectral lines of the frequency comb comes about after convolution at the local oscillator line of the components of the frequency comb above and below the local oscillator line. In another formulation, this means that in this case the local oscillator frequency is preferably positioned asymmetrically between two lines of the frequency comb. All the frequency differences (which correspond to possible intermediate frequencies) between local oscillator frequency and an arbitrarily selected spectral line of the frequency comb are thereby different. This means, at the same time, that it is possible with the aid of a single frequency conversion and a sufficiently narrow band intermediate frequency filter—IF filter—to convert in a targeted manner a (single) spectral line of the frequency comb uniquely to the (largely arbitrarily) selectable intermediate frequency (1st IF in FIG. 6).

Figure 6:
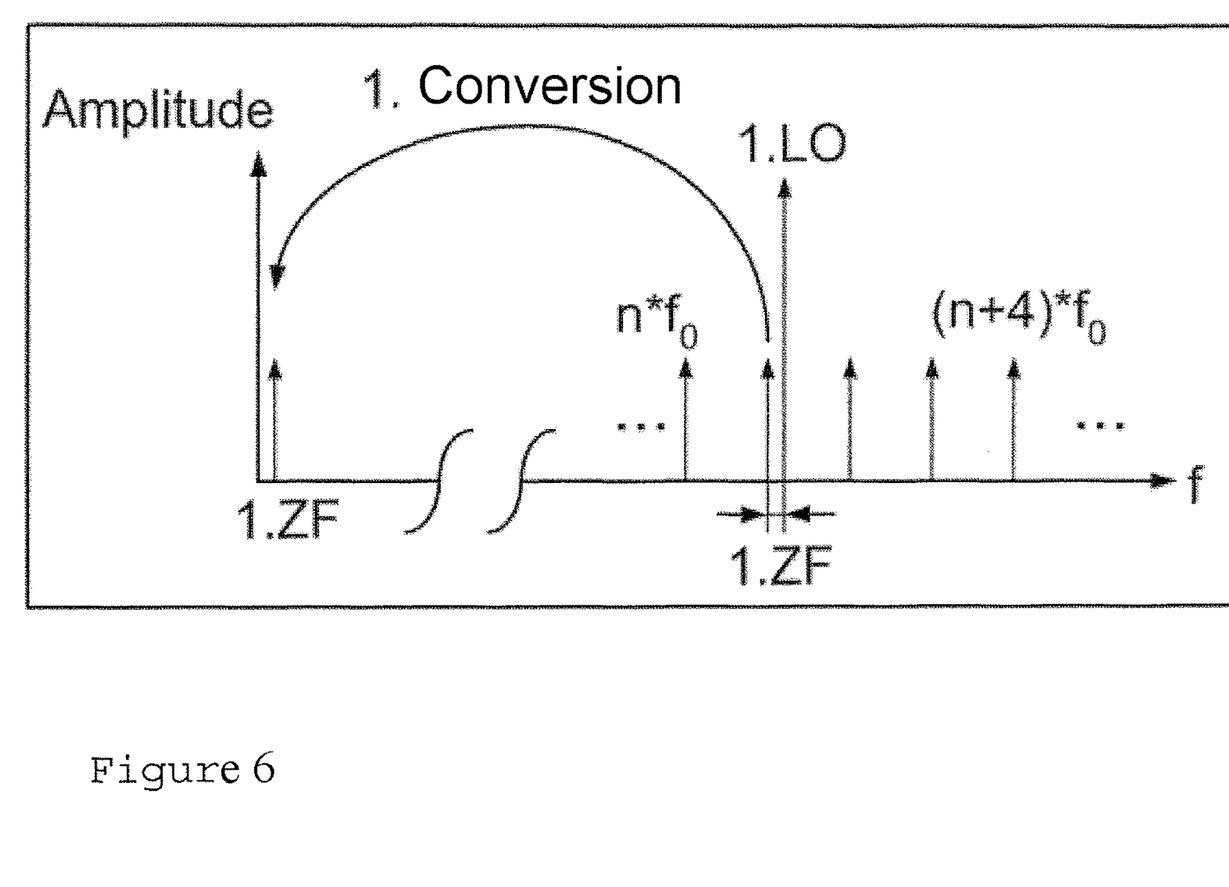

In accordance with the preceding statements, the local oscillator is set to a frequency of 24 010.0 MHz, by way of example. At 24 000.0 MHz, the spectral line is thereby converted to the intermediate frequency of 10.0 MHz. The spectral lines of the frequency comb that are converted to other frequencies are preferably suppressed by a sufficiently narrow band 10 MHz IF filter. There is thus available at the receiver output a purely sinusoidal IF signal of frequency 10 MHz which can be uniquely assigned to the 24.0 GHz spectral line of the frequency comb.

Figure 7:
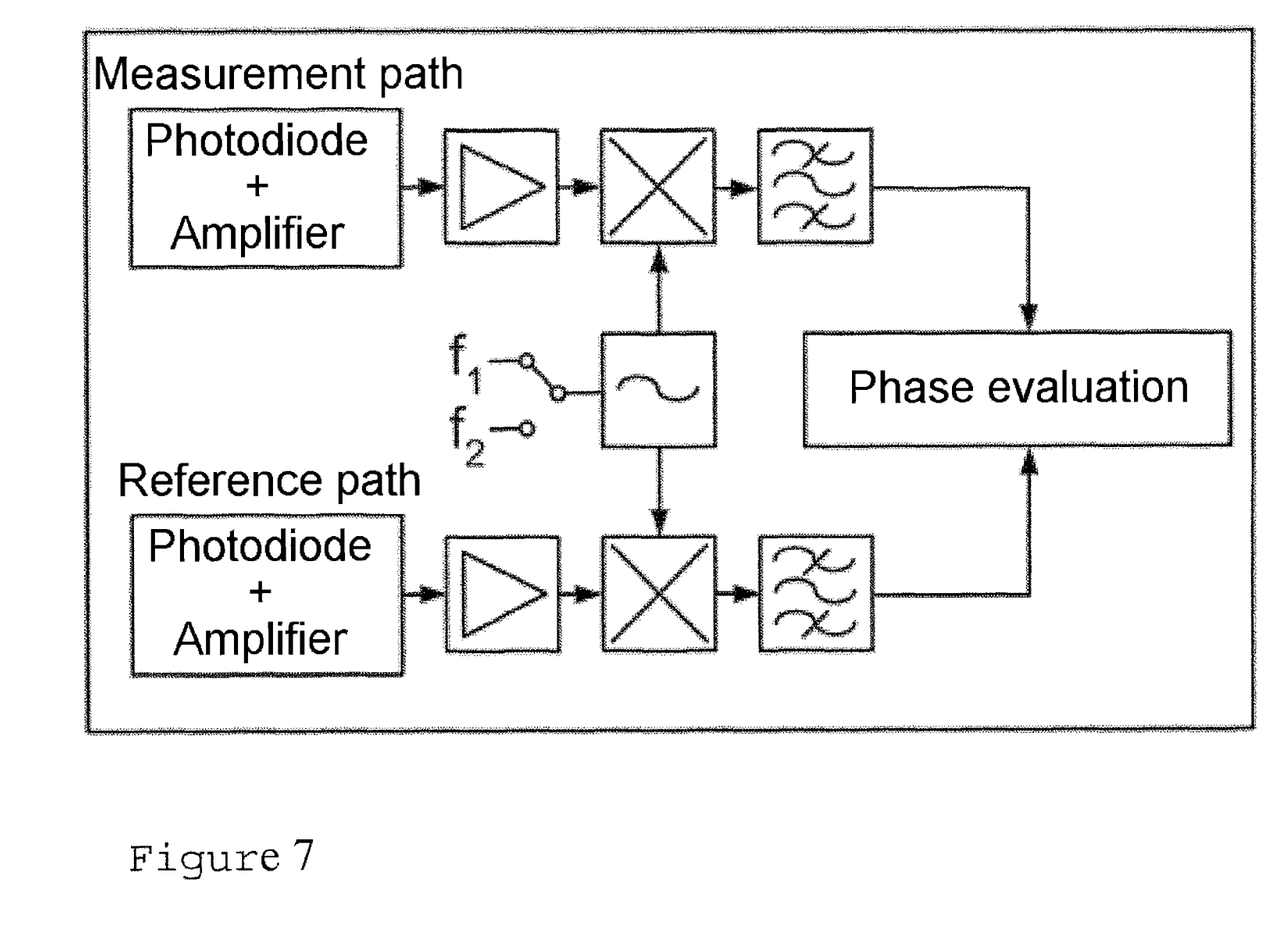

In order to increase yet further the uniqueness range of the distance measurement, the receiver can be designed so that it is possible to evaluate not only the spectral line at 24 GHz, but, for example, also the adjacent one at 24.1 GHz. This is rendered possible by two LO frequencies $f_1$ and $f_2$ (see FIG. 7). By way of example, FIG. 7 shows a receiver having a frequency converter with a switchable local oscillator.

Because of the periodicity of the trigonometric functions, the measured phase difference $\phi_{MESS}$ is always limited to the range of 0° to 360°. The actual phase at the angle of frequency $\omega_1$ is, however, $$\omega_1\tau=\phi_{MESS,1}+n\cdot 2\cdot\pi, \text{ where } n\in N, \quad (2)$$

and, at the angle of frequency $\omega_2$ $$\omega_2\tau=\phi_{MESS,2}+m\cdot 2\cdot\pi, \text{ where } m\in N. \quad (3)$$

The variables m, n are firstly not yet known here. The propagation time $\tau$ is the variable being sought. The terms $\omega_1 \cdot \tau$ and $\omega_2 \cdot \tau$ can differ from one another by at most $2 \cdot \pi$ for $f_1$=24 GHz and $f_2$=24.1 GHz and $0 < \tau < 10$ ns (corresponding to a path distance of up to 3 m).

$$\omega_2 \cdot \tau \omega_1 \cdot \tau = 2\pi \cdot \tau (f_2 - f_1) = 2 \cdot \pi \text{ for } \tau = 10 \text{ ns} \quad (4)$$

It therefore holds that either n=m or n+1=m. If equations (2) and (3) are subtracted from one another, the result is $$\tau = \frac{\varphi_{MESS,2} - \varphi_{MESS,1} + 2 \cdot \pi \cdot (m - n)}{2 \cdot \pi \cdot 100 \text{ MHz}} \quad (5)$$

The propagation time $\tau$ is now determined using the equation (5) distinguishing cases: for $\phi_{MESS,1} < \phi_{MESS,2}$, m−n=0 is set, and for $\phi_{MESS,1} > \phi_{MESS,2}$, m−n=1 is set. Accordingly, $$\tau = \frac{\varphi_{MESS,2} - \varphi_{MESS,1}}{2 \cdot \pi \cdot 100 \text{ MHz}} \text{ for } \varphi_{MESS,1} < \varphi_{MESS,2} \quad (6)$$

or $$\tau = \frac{\varphi_{MESS,2} - \varphi_{MESS,1} + 2 \cdot \pi}{2 \cdot \pi \cdot 100 \text{ MHz}} \text{ for } \varphi_{MESS,1} > \varphi_{MESS,2}. \quad (7)$$

A unique assignment of the measured phases $\phi_{MESS,1}$ and $\phi_{MESS,2}$ is therefore possible in relation to the propagation time $\tau$ inside the uniqueness range of 3 m.

Figure 8:
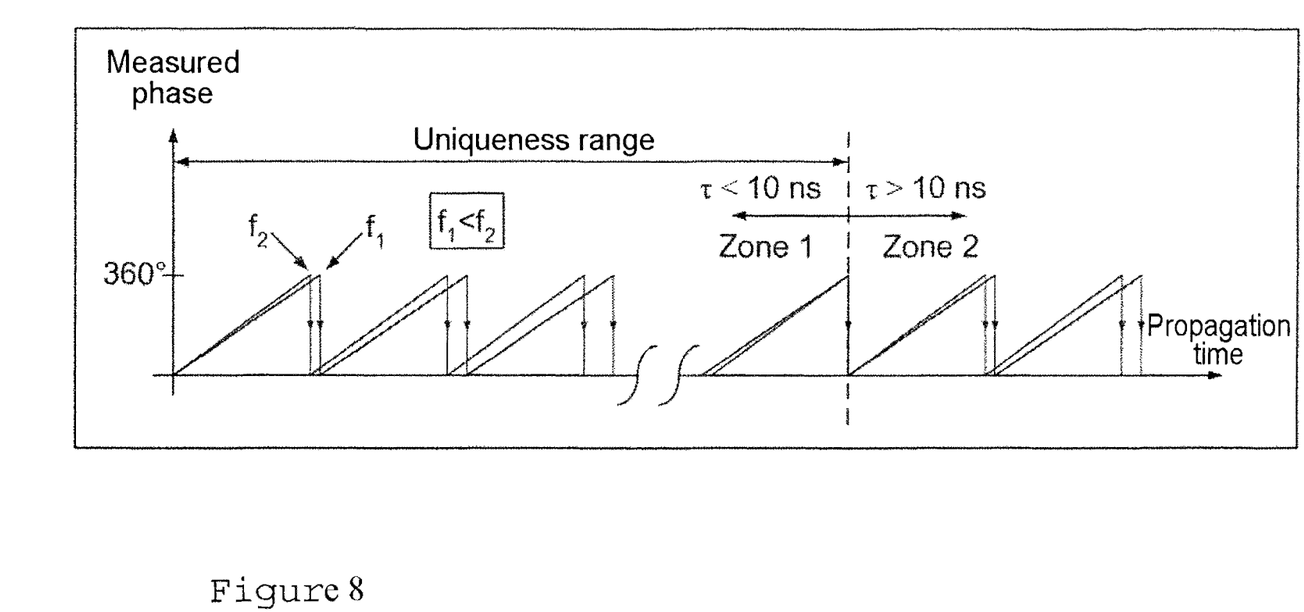

FIG. 8 shows the phases respectively measured for both signal frequencies, plotted against the signal propagation time. A specific pair of measured phases $\phi_{MESS,1}$ and $\phi_{MESS,2}$ may be assigned inside the uniqueness range to exactly one propagation time, and thus exactly one distance from the measurement object.

The above selected uniqueness range of 3 m is to be considered as an example, and is given by the frequency spacing of two spectral lines of the frequency comb or by the lowest frequency thereof (100 MHz in the present example). It is to be added, in particular, that the correctness of the determination of the propagation time is easy to verify from the ambiguous phase:

As has already been shown initially, the total phase $\phi = \omega \cdot \tau$, that is to say for a given (constant) propagation time $\tau$, $\phi$ is proportional to $\omega$, and $\tau$ is the gradient of this functional relationship. It is therefore possible to write the equation (1) as a discrete equation in the form of $$\tau \stackrel{!}{=} \frac{\varphi_1}{\omega_1} \stackrel{!}{=} \frac{\varphi_2}{\omega_2} \stackrel{!}{=} \frac{\varphi_2 - \varphi_1}{\omega_2 - \omega_1} \stackrel{!}{=} \ldots \quad (8)$$

The correctness of the total phase $\phi$ determined from the ambiguous measurement phase $\phi_{Mess}$ can therefore easily be demonstrated for a general frequency f.

It is possible to distinguish between different distance zones by evaluating the signal strength of the measurement signal (Zone 1, Zone 2 etc. in FIG. 8). Consequently, the signal strength can be used to undertake a preselection of the ordinal numbers m and n introduced in equations (2) and (3), and so $\tau$ can be determined again from equation (5). It is possible again to verify the correctness of m, n as used via equation (8).

The great advantage of the abovedescribed method is that the 100 MHz receiver can be entirely discarded. The outlay on receiver electronics is thereby greatly reduced.

The invention claimed is:

1. A method for measuring the distance of an object, comprising the steps of:
    generating a transmitted signal (S) with a pulse train having prescribed pulse repetition frequency (fw) such that the transmitted signal has a frequency comb in the frequency domain,
    directing the transmitted signal onto the object, and a reflected signal (R) reflected from the object is received,
    wherein the phase difference ($\phi_{MESS,1}$) between the transmitted signal and the reflected signal is determined for a prescribed spectral line of the frequency comb, and the distance is determined with the aid of the phase difference;
wherein
    the phase difference ($\phi_{MESS,2}$) between the transmitted signal and the reflected signal is determined for a second spectral line of the frequency comb, and
    both the phase difference ($\phi_{MESS,1}$) between the transmitted signal and the reflected signal for the first spectral line, and the phase difference ($\phi_{MESS,2}$) between the transmitted signal and the reflected signal for the second spectral line are used in determining the distance.

2. The method as claimed in claim 1, wherein
    a test is made as to whether the phase difference ($\phi_{MESS,1}$) for the first spectral line is greater or less than the phase difference ($\phi_{MESS,2}$) for the second spectral line, and
    the distance is determined as a function of the test result.

3. The method as claimed in claim 1, wherein the second spectral line has a higher frequency than the first spectral line, and a distance value A is determined in accordance with $$A = c * \frac{\varphi_{MESS,2} - \varphi_{MESS,1}}{2 \cdot \pi \cdot fw} \text{ if it holds that } \varphi_{MESS,1} < \varphi_{MESS,2}$$

and $$A = c * \frac{\varphi_{MESS,1} - \varphi_{MESS,2} + 2 \cdot \pi}{2 \cdot \pi \cdot fw} \text{ if it holds that } \varphi_{MESS,1} > \varphi_{MESS,2}$$

c denoting the propagation rate of the transmitted signal to the object, $\phi_{MESS,1}$ denoting the phase difference between transmitted signal and reflected signal for the first spectral line, $\phi_{MESS,2}$ denoting the phase difference between transmitted signal and reflected signal for the second spectral line and fw denoting the pulse repetition frequency.

4. The method as claimed in claim 1, wherein two spectral lines of the frequency comb that are adjacent in the frequency spectrum are evaluated as first and second spectral lines.

5. The method as claimed in claim 1 wherein
    the first and the second spectral lines of the transmitted signal and of the reflected signal are respectively downmixed to the same intermediate frequency, and
    the phase difference ($\phi_{MESS,1}$) between the transmitted signal and the reflected signal for the first spectral line, and the phase difference ($\phi_{MESS,2}$) between the transmitted signal and the reflected signal for the second spectral line are determined with the aid of the downmixed signals.

6. The method as claimed in claim 5, wherein an oscillator frequency that lies in the frequency band asymmetrically between two adjacent spectral lines of the frequency comb is used for the downmixing.

7. The method as claimed in claim 6, wherein
    the transmitted signal and the reflected signal for the first and the second spectral lines are respectively downmixed to an intermediate frequency between 1 kHz and 20 MHz, preferably to 10.7 MHz.

8. An arrangement for measuring the distance (A) of an object, comprising
- a transmitter for generating a transmitted signal (S) that has a pulse train with a prescribed pulse repetition frequency (fw) in the time domain, and a frequency comb in the frequency domain,
- a receiver for receiving a reflected signal (R) reflected by the object, and an evaluation device that uses the phase difference ($\phi_{MESS,1}$) between the transmitted signal and the reflected signal for a prescribed spectral line of the frequency comb in order to determine the distance;
- wherein the evaluation device determines the phase difference between the transmitted signal and the reflected signal for two different spectral lines of the frequency comb, and uses the two phase differences in order to determine the distance.

9. The arrangement as claimed in claim 8, wherein the evaluation device is configured in such a way that it tests whether the phase difference ($\phi_{MESS,1}$) for the first spectral line is greater or less than the phase difference ($\phi_{MESS,2}$) for the second spectral line, and determines the distance as a function of the test result.

10. The arrangement as claimed in claim 8, wherein the arrangement has at least one switchable oscillator and at least two mixers connected to the oscillator, the two mixers optionally downmixing the first or the second spectral line of the transmitted signal and of the reflected signal to the same intermediate frequency.

11. The arrangement as claimed in claim 10, wherein the oscillator frequency of the oscillator lies in the frequency band asymmetrically between two adjacent spectral lines of the frequency comb of the transmitted or reflected signal.

* * * * *